UNITED STATES PATENT OFFICE.

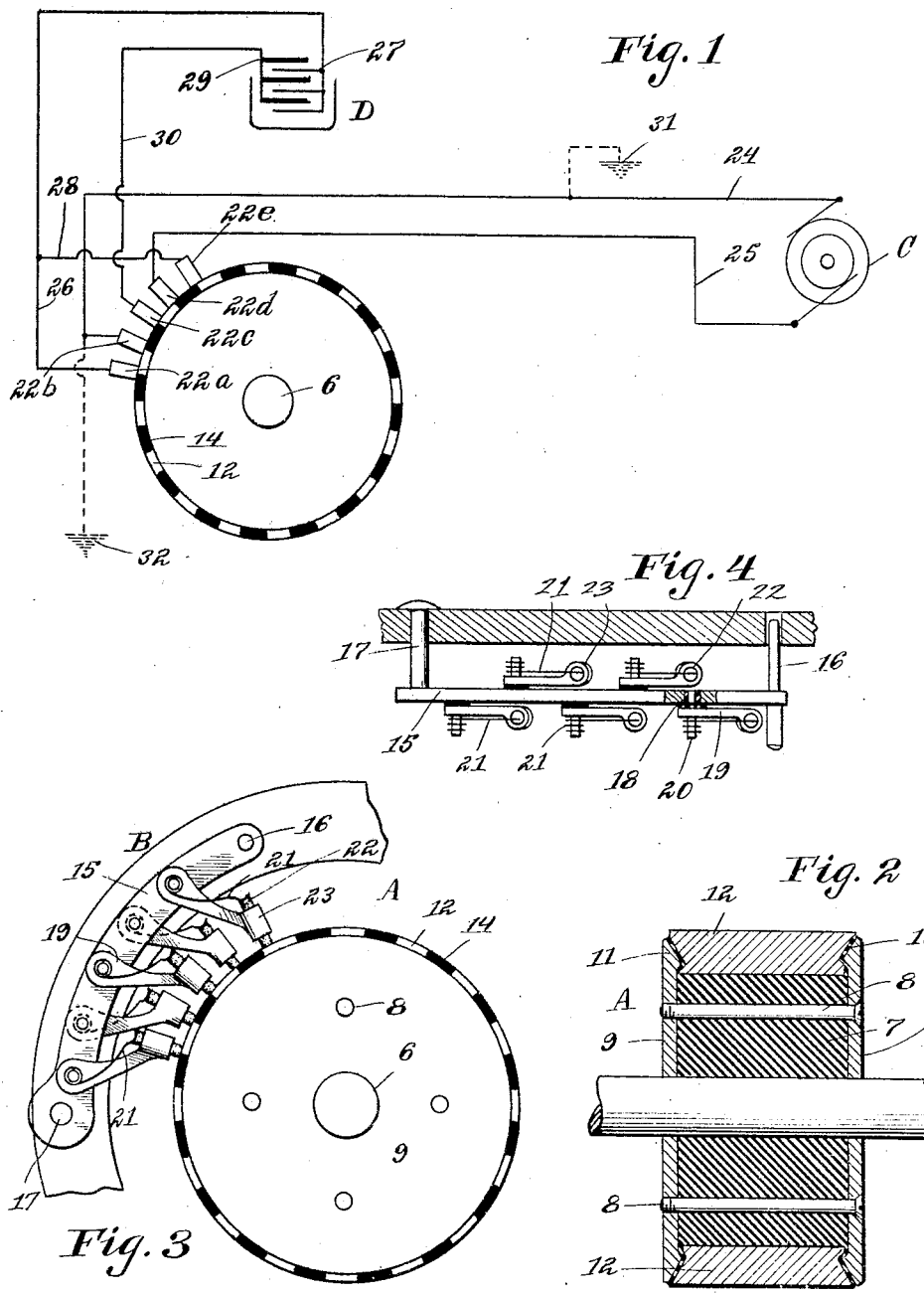

FRED WOODSIDE AND DOSS WRIGHT, OF DILLON, MONTANA.

CURRENT-RECTIFIER.

1,269,891.      Specification of Letters Patent.      Patented June 18, 1918.

Application filed September 28, 1917.   Serial No. 193,816.

*To all whom it may concern:*

Be it known that we, FRED WOODSIDE and Doss WRIGHT, citizens of the United States, residing at Dillon, in the county of Beaverhead and State of Montana, have invented new and useful Improvements in Current-Rectifiers, of which the following is a specification.

This invention is a rectifier more particularly adapted to the rectification of an alternating current into a direct current and may be employed upon self-propelled vehicles using a magneto or other dynamo-electric machine generating an alternating current wherein the direct current so produced may be utilized in the charging of storage batteries from which current may be taken for lighting and starting or any other current consuming devices.

One object of the invention is to provide a rectifier having a rotatable commutator upon which may press in a contact relation a series of brushes that are suitably interconnected with a generator of alternating current and a storage battery so that direct current will be delivered to the battery or other direct current consuming device.

Another object is to provide a brush holder that may be pivotally mounted and have brushes carried therein that may be removable therefrom.

Broadly stated, the invention comprises a suitable commutator mounted for rotation, a brush holder comprising a pivotally mounted arm having a series of removable brushes disposed therein and insulated from each other and from the holder, and circuits for said brushes to connect said brushes with an alternating current generator and devices using a direct current.

One practical form of construction and assembly will be described and illustrated in the accompanying drawings, in which—

Figure 1 is a diagrammatic view of the circuit arrangement.

Fig. 2 is a part sectional view of the commutator.

Fig. 3 is a side elevation of the brush holder and brushes, and

Fig. 4 is a top plan view of the brush holder.

In the preferred embodiment about to be described the commutator may be generally indicated at A and is preferably mounted upon a shaft 6. The commutator may consist of a body portion 7 which may be formed as a ring-like member having a hole therethrough so that the shaft 6 may pass through the body 7.

Any suitable holding means may be employed to retain the body 7 upon the shaft 6. Arranged around the central hole through which the shaft 6 passes there may be arranged a series of concentric holes through which the bolts 8 pass. These holes are all preferably arranged in an axial direction. To coöperate with the lateral faces of the body portion 7 are end plates 9 and 10 that may also be provided with central holes through which the shaft 6 will pass. They are also provided with registering holes so that the bolts 8 may pass through them and through the body portion to hold the end plates securely to said body portion. The peripheral edges of these end plates may be angularly formed, as indicated at 11.

The angular formation, as shown, is concentric to the shaft 6 and is provided for the purpose of securing a contacting surface that serves to compress the ends of the segments 12 therebetween. The segments 12 are preferably formed to coöperate in the usual manner and may be provided with a V-shaped groove to engage with the angular formed edge 11. If desired, suitable insulation 13 may be interposed between the ends of the segments or commutator bars 12 and the angular formed edge 11.

As shown, this angular formed edge may be so produced that it forms an inverted V-shaped annulus upon the inner lateral face on each of the end plates 9 and 10. If desired, the body 7 may be formed of insulating material. The segments or commutator bars 12 are preferably spaced around the body 7 in regular order and interposed between the bars is an insulating portion 14. This insulating portion 14 may be formed integrally with the body portion 7 and therefore constitute a part thereof. As shown, the body 7 will thus comprise a series of slots which may have tapering walls to accommodate the bars 12 therein.

The brush holder B consists of an arcuate arm 15, pivotally secured to a fixture, as the commutator casing by a pin 17, engaging one end of the arm, and held in operative relation by a removable pin 16, passing through the opposite end of the arm and engaging the fixture. The arrangement permits swinging of the arm away from the commutator when desired for cleaning, by removing the pin 16. The arm 15 may be provided with a series of holes bushed with insulating material 18. Adapted to be inserted into these bushed holes are brush holders. These brush holders may consist of an arm 19, and at one end may be provided with a hole through which passes a pin 20 serving as a pintle. This pin 20 is preferably secured in the bushing 18 which is disposed in the hole in the brush holding arm 15.

Coöperatively connected with the brush holder arm 19 is a coil spring 21. One end of this coil spring may be coiled to coöperate with the arm 15 and be secured thereto, while the free end is so positioned that it will bear upon the arm 19 at a suitable point. The outer end of the arm 19 may be formed with a hole through which passes a brush 22. The end of the arm 19 may be formed as a sleeve or holder 23 which is adapted to engage with and retain the brush 22 in a firm manner. The arm 19 and the brush engaging end 23 are so formed that the brush 22 will bear substantially radially upon the commutator bars 12.

The bars 19 are preferably alternately positioned upon opposite sides of the arm 15 of the brush holder B. By this alternate arrangement of the arm 19, the brushes 22 thus contact with the bars of the commutator in a staggered relation, and therefore, overlap each other. This is done so that one brush will not track immediately after the preceding brush which tends to form undesired grooves in the bars 12 and insulating portion 14.

An alternating current generator or magneto C may be provided with the suitable line wires 24 and 25. The line wire 24 is connected in a suitable manner with the brush $22^b$. The line wire 25 is connected with the brush $22^d$. The brush $22^a$ has connected thereto a conductor 26 which is, at its other end, connected to the positive terminal 27 of the storage battery D. The brush $22^e$ is also connected to the conductor 26 by means of the conductor 28. The negative terminal 29 of the storage battery D connects with the brush $22^c$ through the conductor 30.

The commutator A is preferably provided with the same number of bars as the number of poles in the alternating current generator or magneto. In the case of a magneto such as is employed upon the self-propelled vehicle manufactured by the Ford Motor Company, a magneto has sixteen poles. In the drawings accompanying this case the commutator is provided with sixteen bars.

Assuming the generator to be connected up in the manner indicated with the several brushes of the commutator and shaft 6 so arranged to revolve in unison or synchronously with the generator, we will assume that the positive impulse is forwarded along the line wire 24. This line wire being connected with the brush $22^b$ permits the positive impulse to pass from the brush $22^b$ through one of the commutator bars to the brush $22^a$ thence by means of the conductor 26 to the positive terminal 27 of the storage battery D. The current then leaves by way of the negative terminal 29 through the conductor 30 to the brush $22^c$. One of the commutator bars then being in contact with this brush and with the brush $22^d$ leaves the brush $22^d$ by means of the line wire 25, thence to the generator C.

A continuing rotation of the commutator and of the generator on the next cycle permits the positive impulse from the generator C to pass through the line conductor to the brush $22^d$ and commutator bar to the brush $22^e$, thence to the positive terminal 27 of the storage battery. The current then leaves by means of the negative terminal 29 passing through the brush $22^c$ by means of the conductor 30. From this brush by means of the commutator bar it passes through the brush $22^b$ to the generator C by means of the line wire 24.

When the device is particularly employed upon the Ford vehicle, the line wire may be grounded, as indicated at 31 and the brush $22^b$ may be grounded as at 32. This is done because there is only one terminal upon the Ford magneto, the other terminal being grounded upon the frame.

What we claim is:

An alternating current rectifier, comprising a rotatable commutator, a holder pivotally mounted at one end, removable means for securing the opposite end of the holder in operative relation to the commutator, and a series of brushes carried by the holder and arranged on opposite sides thereof and in staggered relation.

In testimony whereof we affix our signatures.

FRED WOODSIDE.
DOSS WRIGHT.

Copies of this patent may be obtained for five cents each, by addressing the "Commissioner of Patents, Washington, D. C."